C. S. PARKS.
FISHING REEL.
APPLICATION FILED OCT. 12, 1921.
1,434,626.
Patented Nov. 7, 1922.
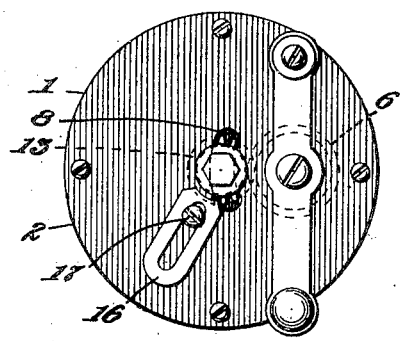
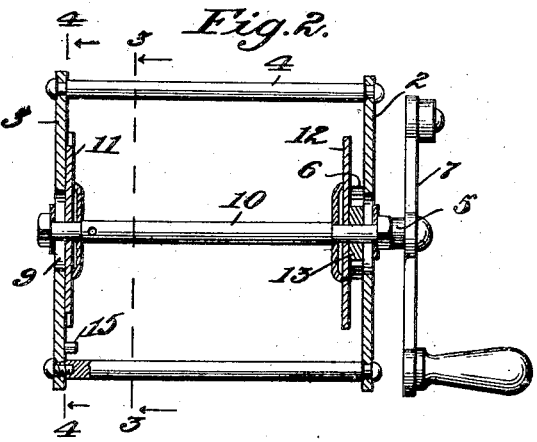
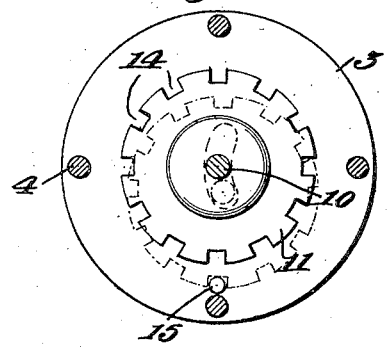
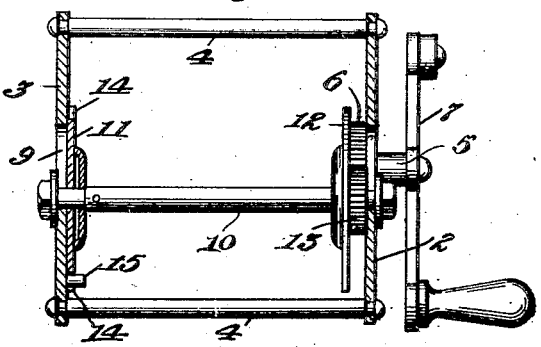
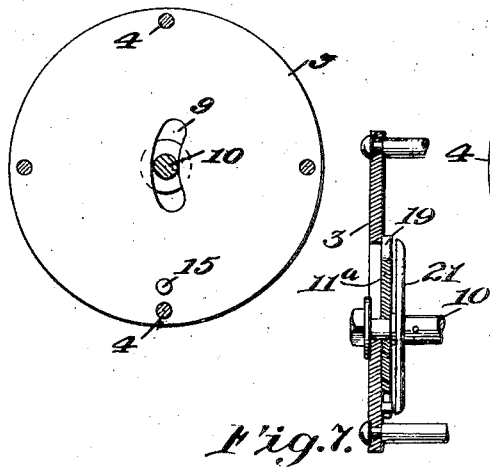
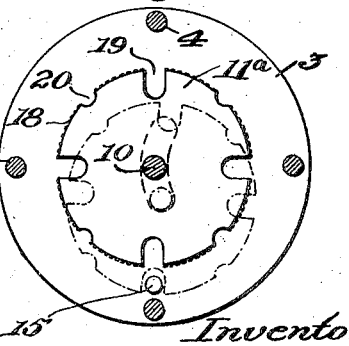
Inventor:
Charles S. Parks,
Eccleston & Eccleston
Att'ys.

Patented Nov. 7, 1922.

1,434,626

UNITED STATES PATENT OFFICE.

CHARLES S. PARKS, OF KENT CITY, MICHIGAN.

FISHING REEL.

Application filed October 12, 1921. Serial No. 507,289.

*To all whom it may concern:*

Be it known that I, CHARLES S. PARKS, a citizen of the United States, residing at Kent City, in the county of Kent and State of Michigan, have invented certain new and useful Improvements in Fishing Reels, of which the following is a full, clear, and exact description thereof.

My invention relates to a fishing reel and has for its object to provide such a device with means to prevent tangling of the line due to the excess unwinding thereof when the bait or lure is cast. To this end I have provided means for retarding the motion of the drum as the pull of the lure decreases and other means for locking the drum when the pull entirely ceases.

Another object of the invention is the provision of the latching device whereby the reel may be converted into an ordinary form of reel such as is now on the market, if desired.

Other objects and advantages of the invention will be apparent from the following description, when taken in connection with the accompanying drawing, in which;

Figure 1 is an end view of the reel with the drum in neutral position.

Figure 2 is a longitudinal section through the device.

Figure 3 is a section on line 3—3 of Figure 2 looking in the direction of the arrows.

Figure 4 is a section similar to Figure 2 with the reel in locked position.

Figure 5 is a section similar to Figure 3 with the ends of the reel removed.

Figure 6 is a section similar to Figure 3 showing a modification which includes both a braking device and a locking device, and Figure 7 is a vertical section through Figure 6.

Referring to the drawings more in detail, the numeral 1 designates the ordinary fishing reel frame, which comprises the end disks 2 and 3, and brace rods 4. A shaft 5 is mounted on the disk 2 and carries a pinion 6 on its inner end, and a crank 7 on its outer end.

The present form of the invention shows arc-shaped slots 8 and 9 formed in the end disks 2 and 3. The center of curvature of these slots is the shaft 5. The reel, which comprises the drum 10 and disks 11 and 12, has its ends, which extend beyond the disks 11 and 12, mounted in the slots 8 and 9. Mounted on the drum 10 is a pinion 13 which meshes with pinion 6 on the shaft 5. By having the slots 8 and 9 curved in the manner above described it will be seen that the reel may be moved to any position in the slots and the pinions 6 and 13 will remain in mesh.

The disk 11 is formed with regularly spaced notches 14 around its periphery, while the frame disk 2 is provided with a pin or lug 15.

From the foregoing construction it will be seen that as the cast is made the drum will slide upwardly in the slots 8 and 9, thereby disengaging a notch 14 from the pin 15, and permitting the line to unwind. When the pull of the bait or lure ceases the drum will return by gravity and one of the notches 14 will engage the pin 15 thereby preventing further unwinding of the line.

In the modified form of the invention shown in Figures 6 and 7 I have provided the disk 11ª with a serrated or milled periphery 18. The disk is also provided with the alternately spaced, deep and shallow notches 19 and 20. A disk 21 may be secured to the drum for the purpose of concealing the braking and locking disk 11ª.

By means of this last described construction the milled portion 18 engages the pin 15 as soon as the pull of the lure begins to lag. This engagement of the milled portion with pin 15 retards somewhat the turning movement of the drum. At slower speeds the shallow notches 20 will engage the pin 15 and finally one of the deeper notches 19 will engage the pin, and the drum will be held stationary.

If it is desired to use the reel in the ordinary manner it is only necessary to move the latch 16 shown in Figure 1 upwardly and secure it by means of the screw 17. The drum is then locked in the upper ends of the slots 8 and 9, and may be operated in the well known manner.

In accordance with the patent statutes I have described what I now believe to be the best embodiment of the invention, but I do not wish to be understood thereby as limiting myself or the scope of the invention, as many changes and modifications may be made without departing from the spirit of the invention, all such I aim to include in the scope of the appended claims.

What I claim as new is:

1. In a braking device for fishing reels including a frame, a reel mounted for bodily movement with respect to said frame, cooperating means on said reel and frame for braking the former, said means being controlled by the position of the reel in the frame as determined by the tension on the line.

2. In a braking device for fishing reels including a frame, a reel mounted for bodily movement with respect to said frame, and means operable by the varying tension on the line for braking the reel through relative bodily movement of the reel and frame.

3. In a braking device for fishing reels, a frame, a reel, means for mounting said reel on the frame whereby the former is bodily movable with respect to the latter, and means operable by the varying tension on the line for braking the reel through relative bodily movement of the reel and frame.

4. In a braking device for fishing reels, a frame, a reel, means for mounting said reel on the frame whereby the former is bodily movable with respect to the latter, and automatic means for releasing and braking the reel depending upon the relative position of the reel as determined by the tension on the line.

5. In a braking device for fishing reels, a frame, a reel, means for mounting the reel on the frame whereby the former is bodily movable with respect to the latter, cooperating means on the reel and frame for braking and locking the reel, said cooperating means being operative or inoperative depending on the relative position of the reel as determined by the tension on the line.

6. In a braking device for fishing reels, a frame, a reel having notches on its periphery, means for mounting said reel on the frame whereby the former is bodily movable with respect to the latter, a lug on said frame, one of said notches being normally engaged with said lug but becoming disengaged when sufficient tension is applied to the line.

7. In a braking device for fishing reels, a frame, having elongated slots therein, a reel having its ends positioned in said slots, whereby when the cast is made the reel will rise in said slots, and cooperating means on said reel and frame for braking the former when the line slackens.

8. In a braking device for fishing reels, a frame, a reel, means for mounting said reel on the frame whereby the former is bodily movable with respect to the latter, cooperating means on the reel and frame for causing an initial retardation of the turning movement of the reel through relative bodily movement of the reel and frame as the tension on the line decreases, and other means for locking the reel as the tension on the line ceases.

9. In a braking device for fishing reels including a frame, a reel mounted for bodily movement with respect to the frame, means operable by the tension on the line for braking the reel through relative bodily movement of the reel and frame, and a latch adapted to engage said reel and prevent relative bodily movement between the reel and frame.

10. In a braking device for fishing reels including a frame, a reel, means for mounting said reel on the frame whereby the former is bodily movable with respect to the latter, means normally preventing turning movement of the reel, said means being released by relative bodily movement between the reel and frame.

11. In a braking device for fishing reels, a frame, a reel mounted thereon, cooperating means on the reel and frame for causing an initial retardation of the turning movement of the reel as the tension on the line decreases, and other means for locking the reel as the tension on the line ceases.

12. In a device of the class described, a frame, a reel therefor, means for mounting said reel so that the same is bodily movable with respect to the frame, a portion of said reel being formed with serrations and relatively deep and shallow notches, and means on the frame adapted to be engaged by said serrations and notches dependent upon the relative positions of the reel and frame.

CHARLES S. PARKS.